US009107134B1

(12) United States Patent
Belser et al.

(10) Patent No.: US 9,107,134 B1
(45) Date of Patent: Aug. 11, 2015

(54) EDGE SECTOR HANDOFF DETERMINATION

(75) Inventors: John Eric Belser, Olathe, KS (US);
Jeremy R. Breau, Leawood, KS (US);
Joao Carlos Osorio Gouvea Teixeira de Magalhaes, Shawnee, KS (US); Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 917 days.

(21) Appl. No.: 13/005,210

(22) Filed: Jan. 12, 2011

(51) Int. Cl.
*H04W 52/28* (2009.01)
*H04W 36/30* (2009.01)
*H04W 36/00* (2009.01)

(52) U.S. Cl.
CPC ............ *H04W 36/30* (2013.01); *H04W 52/281* (2013.01); *H04W 52/282* (2013.01); *H04W 52/283* (2013.01); *H04W 36/0083* (2013.01)

(58) Field of Classification Search
CPC combination set(s) only.
See application file for complete search history.

(56) References Cited

U.S. PATENT DOCUMENTS

| 5,487,174 | A  | * | 1/1996  | Persson ........................ 455/444 |
| 6,954,643 | B2 |   | 10/2005 | Petrus |
| 7,260,399 | B1 | * | 8/2007  | Oh et al. ...................... 455/436 |
| 7,672,660 | B2 |   | 3/2010  | Kim et al. |
| 8,180,349 | B1 | * | 5/2012  | Mohan et al. ................. 455/437 |
| 2002/0142773 | A1 | * | 10/2002 | Rudrapatna et al. .......... 455/440 |
| 2004/0097234 | A1 |   | 5/2004  | Rajkotia et al. |
| 2004/0147267 | A1 |   | 7/2004  | Hill et al. |
| 2004/0166864 | A1 | * | 8/2004  | Hill et al. ...................... 455/450 |
| 2006/0094430 | A1 | * | 5/2006  | Shah ............................. 455/436 |
| 2006/0234756 | A1 |   | 10/2006 | Yamasaki et al. |
| 2006/0239238 | A1 |   | 10/2006 | Fernandez-Corbaton et al. |
| 2007/0142050 | A1 |   | 6/2007  | Handforth et al. |
| 2008/0037501 | A1 |   | 2/2008  | Ali et al. |
| 2008/0096560 | A1 | * | 4/2008  | Felske et al. .................. 455/436 |
| 2008/0119192 | A1 |   | 5/2008  | Miyata |
| 2010/0029279 | A1 | * | 2/2010  | Lee et al. ...................... 455/436 |
| 2011/0044269 | A1 | * | 2/2011  | Fan et al. ...................... 370/329 |
| 2011/0206012 | A1 | * | 8/2011  | Youn et al. .................... 370/332 |

* cited by examiner

*Primary Examiner* — Ian N Moore
*Assistant Examiner* — Eric H Wang

(57) ABSTRACT

A wireless communication device comprises a processing system and a communication transceiver. The processing system is configured to determine a location and a velocity of the wireless communication device. The communication transceiver is configured to monitor an RF signal between the wireless communication device and a wireless access node to detect a reduction in RF signal quality. If the reduction in the RF signal quality is detected, the processing system is configured to process the location to determine if the wireless communication device is proximate to an edge sector of the wireless access node, and if so, process the velocity to determine if the wireless communication device is moving towards the wireless access node. The processing system is configured to inhibit a handoff to another wireless access node if the wireless communication device is moving towards the wireless access node, but if not moving towards the wireless access node, to initiate the handoff to the other wireless access node.

11 Claims, 7 Drawing Sheets

EDGE SECTOR HANDOFF DETERMINATION

TECHNICAL BACKGROUND

A wireless communication device communicates with a serving wireless access node using a radio frequency (RF) signal over a wireless communication link. Typically, the wireless communication device continually receives transport level status metrics related to this RF signal, such as a carrier to interference plus noise ratio (CINR) and a received signal strength indicator (RSSI). The CINR and RSSI levels are constantly changing as the wireless communication device moves from one wireless access node to another. In some instances, the RF signal quality will trigger a handoff response if the signal level falls below a certain threshold, which is typically a fixed setting stored in the wireless communication device.

Modern wireless communication devices are often equipped with multiple radio antennas to enable wireless communications with different types of wireless access networks, such as third generation (3G) and fourth generation (4G) wireless networks. When such a device detects a decrease in RF signal strength, it may respond by activating a second radio antenna to search for another wireless access node of a different wireless access network than it is presently in communication with in order to initiate a handoff. When the second radio antenna is activated, additional battery power is drawn from the battery reserves of the wireless communication device. In many cases, the CINR and RSSI levels only decrease momentarily and quickly improve, so the wireless communication device remains in communication with the wireless access node on the initial radio antenna, but has unfortunately depleted additional battery power by unnecessarily activating the second radio antenna.

OVERVIEW

A method of operating a wireless communication device comprises determining a location indicator and a velocity indicator of the wireless communication device and monitoring a radio frequency (RF) signal between the wireless communication device and a wireless access node to detect a reduction in RF signal quality. The method further comprises, if the reduction in the RF signal quality is detected, processing the location indicator to determine if the wireless communication device is proximate to an edge sector of the wireless access node. The method further comprises, if the wireless communication device is proximate to the edge sector, processing the velocity indicator to determine if the wireless communication device is moving towards the wireless access node. The method further comprises, if the wireless communication device is moving towards the wireless access node, inhibiting a handoff to another wireless access node. The method further comprises, if the wireless communication device is not moving towards the wireless access node, initiating the handoff to the other wireless access node.

A wireless communication device comprises a processing system and a wireless communication transceiver. The processing system is configured to determine a location indicator and a velocity indicator of the wireless communication device. The wireless communication transceiver is configured to monitor a radio frequency (RF) signal between the wireless communication device and a wireless access node to detect a reduction in RF signal quality. If the reduction in the RF signal quality is detected, the processing system is configured to process the location indicator to determine if the wireless communication device is proximate to an edge sector of the wireless access node. If the wireless communication device is proximate to the edge sector, the processing system is configured to process the velocity indicator to determine if the wireless communication device is moving towards the wireless access node. If the wireless communication device is moving towards the wireless access node, the processing system is configured to inhibit a handoff to another wireless access node. If the wireless communication device is not moving towards the wireless access node, the processing system is configured to initiate the handoff to the other wireless access node.

A method to determine handoffs for a wireless communication device is also disclosed. The method comprises, in the wireless communication device, determining a location indicator and a velocity indicator of the wireless communication device, and monitoring a radio frequency (RF) signal between the wireless communication device and a wireless access node to detect a reduction in RF signal quality. The method further comprises, if the reduction in the RF signal quality is detected, the wireless communication device transferring a handoff request for delivery to a handoff determination system, wherein the handoff request includes the location indicator and the velocity indicator. The method further comprises, in the handoff determination system, in response to the handoff request, processing the location indicator to determine if the wireless communication device is proximate to an edge sector of the wireless access node. The method further comprises, if the wireless communication device is proximate to the edge sector, the handoff determination system processing the velocity indicator to determine if the wireless communication device is moving towards the wireless access node. The method further comprises, if the wireless communication device is moving towards the wireless access node, the handoff determination system inhibiting a handoff to another wireless access node by transferring a denial message for delivery to the wireless communication device. The method further comprises, if the wireless communication device is not moving towards the wireless access node, the handoff determination system transferring an approval message for delivery to the wireless communication device indicating approval for the wireless communication device to initiate the handoff to the other wireless access node.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
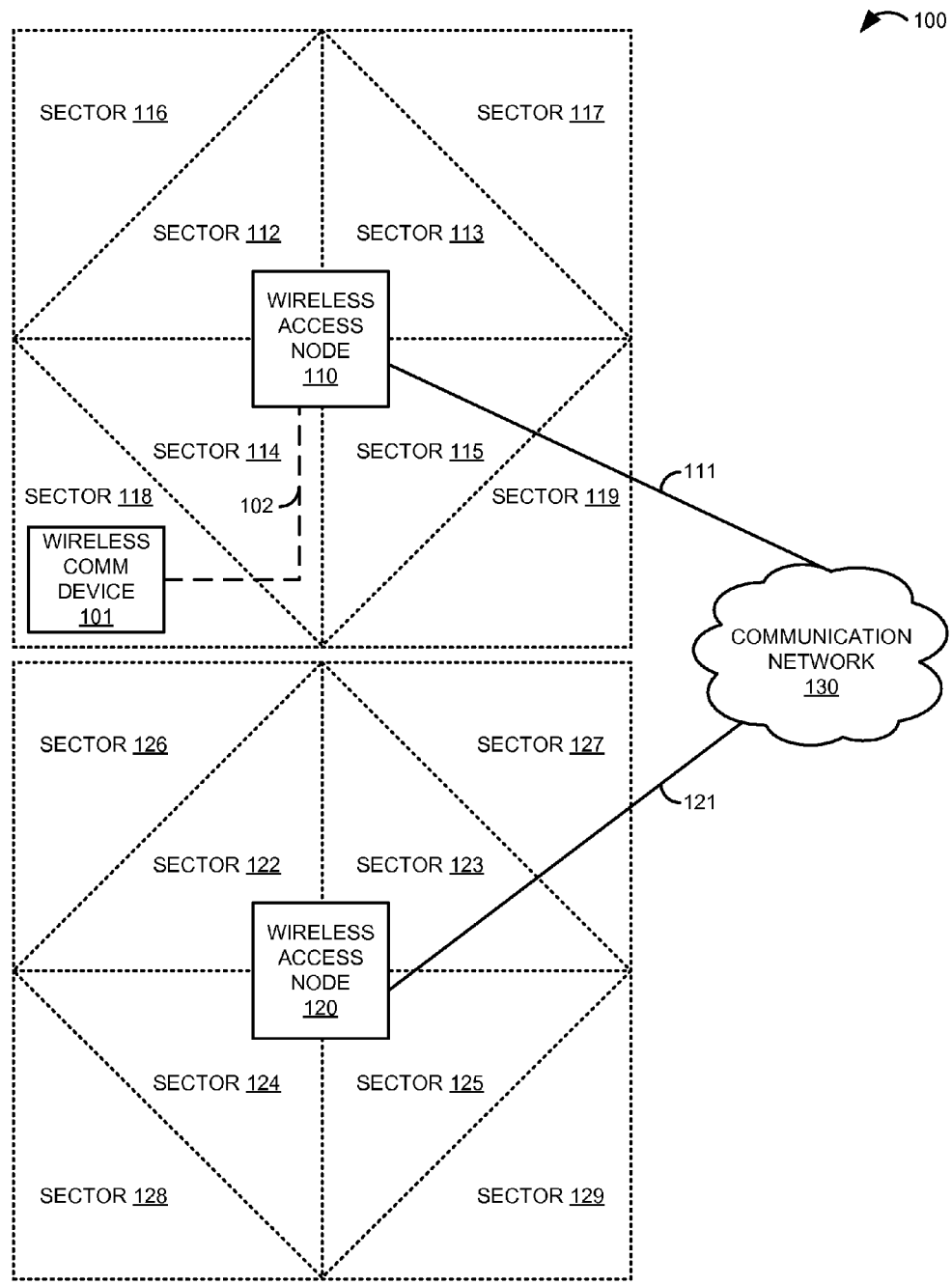
FIG. 1 is a block diagram that illustrates a communication system.

FIG. 1 is a block diagram that illustrates communication system 100. Communication system 100 includes wireless communication device 101, wireless access nodes 110 and 120, and communication network 130. In FIG. 1, wireless access node 110 serves sectors 112-119, and wireless access node 120 serves sectors 122-129. Sectors 112-119 and 122-129 shown in FIG. 1 represent geographic areas of signal coverage served by respective wireless access nodes 110 and 120. In particular, sectors 112-115 served by wireless access node 110 are adjacent to node 110, while edge sectors 116-119 served by wireless access node 110 are located on the periphery of coverage provided by node 110. Likewise, sectors 122-125 served by wireless access node 120 are adjacent to node 120, while edge sectors 126-129 served by wireless access node 120 are located on the periphery of coverage provided by node 120. Wireless access node 110 and communication network 130 communicate over communication link 111, while wireless access node 120 and communication network 130 communicate over communication link 121. Wireless communication device 101 and wireless access node 110 are in communication over wireless communication link 102. As shown in FIG. 1, wireless communication device 101 is presently located in edge sector 118 served by wireless access node 110.

Figure 2:
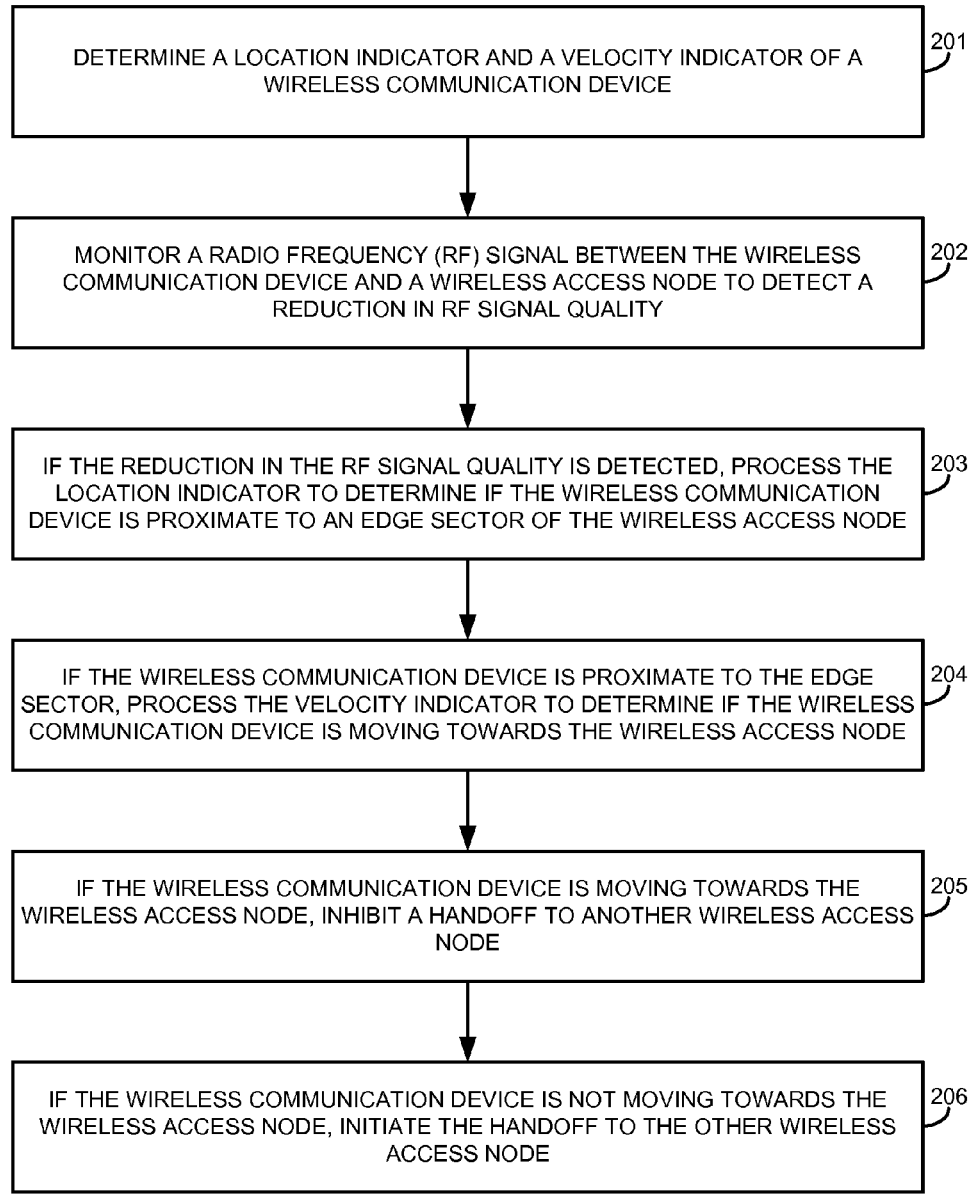
FIG. 2 is a flow diagram that illustrates an operation of the communication system.

FIG. 2 is a flow diagram that illustrates an operation of communication system 100. The steps of the operation are indicated below parenthetically. In particular, the operation of FIG. 2 shows a method of operating wireless communication device 101 within communication system 100.

In FIG. 2, wireless communication device 101 determines a location indicator and a velocity indicator of wireless communication device 101 (201). Wireless communication device 101 could use a variety of techniques to determine the location indicator and the velocity indicator. For example, to determine the location indicator, wireless communication device 101 could utilize a global positioning system (GPS), triangulation or multilateration techniques, cell identification techniques such as cell of origin or control plane locating, information that is accessible from communication network 130, such as a serving mobile switching center (MSC) or other network element, course location messages (CLM), which provide the latitude and longitude of a serving network sector 118, a database that stores location information of device 101, such as a home location register (HLR), or any other location determination technique. The location indicator typically comprises geographical coordinates of the location of wireless communication device 101, such as GPS coordinates or latitude and longitude, although the location indicator could comprise additional or alternative information, such as an identifier of a serving wireless access node 110 and/or a serving sector 118, an MSC or some other network element serving wireless communication device 101, a system identification number (SID) and a network identification number (NID) associated with a serving sector 118 of wireless access node 110, a trunk group identifier, or any other information that indicates the location of wireless communication device 101.

The velocity indicator typically indicates a direction of velocity of wireless communication device 101. Wireless communication device 101 could determine the velocity indicator in a number of ways. Typically, wireless communication device 101 utilizes knowledge of present and prior locations along with corresponding timestamps to calculate a rate and direction that device 101 is moving in order to determine the velocity indicator, but other techniques and data could also be used in other examples, such as information from a serving wireless access node 110 or other network elements, information from an accelerometer, or some other manner of determining a velocity of wireless communication device 101. In some examples, the velocity indicator comprises a velocity vector indicating a velocity and a direction in which wireless communication device 101 is moving.

Wireless communication device 101 monitors a radio frequency (RF) signal between wireless communication device 101 and wireless access node 110 to detect a reduction in RF signal quality (202). Typically, wireless communication device 101 may monitor the RF signal quality by calculating a carrier to interference plus noise ratio (CINR), a received signal strength indicator (RSSI), a signal to noise ratio (SNR), or some other technique of measuring RF signal quality—including combinations thereof. In some examples, wireless communication device 101 may detect the reduction in RF signal quality by comparing the RF signal quality to threshold values.

If the reduction in the RF signal quality is detected, wireless communication device 101 processes the location indicator to determine if the wireless communication device 101 is proximate to an edge sector 118 of the wireless access node 110 (203). This example assumes that wireless communication device 101 has detected a reduction in the RF signal quality of the RF signal between device 101 and wireless access node 110. Since wireless communication device 101 is located within edge sector 118 served by wireless access node 110, wireless communication device 101 determines that device 101 is located proximate to edge sector 118 based on the location indicator. In some examples, wireless communication device 101 may request or automatically receive a location-based handoff table from communication network 130, and device 101 could process the location indicator with the location-based handoff table to determine if device 101 is proximate to an edge sector 118 of wireless access node 110. Although not shown in FIG. 1, note that device 101 could be located within a sector 114 that is adjacent to an edge sector 118 and could still be considered proximate to the edge sector 118.

If wireless communication device 101 is proximate to the edge sector 118, wireless communication device 101 processes the velocity indicator to determine if wireless communication device 101 is moving towards wireless access node 110 (204). Since wireless communication device 101 previously determined that device 101 is proximate to edge sector 118 in operation 203, wireless communication device 101 determines if device 101 is moving towards the wireless access node 110 presently serving device 101 based on the velocity indicator. In some examples, wireless communication device 101 utilizes information regarding a location of the serving wireless access node 110 in addition to the location of wireless communication device 101 and the velocity indicator in order to determine whether device 101 is moving towards wireless access node 110. Alternatively, wireless communication device 101 could determine whether device 101 is moving away from wireless access node 110. For example, if wireless communication device 101 is located within sector 114 (not shown), wireless communication device 101 could determine whether device 101 is moving towards an edge sector 118. In some examples, wireless communication device 101 could utilize the location-based handoff table discussed above to retrieve the information necessary to make these determinations.

If wireless communication device 101 is moving towards wireless access node 110, wireless communication device 101 inhibits a handoff to another wireless access node 120 (205). For example, if wireless communication device 101 is moving towards wireless access node 110, it is likely that device 101 will soon enter the geographic area designated as sector 114 served by wireless access node 110, which could result in an improvement of the RF signal quality between device 101 and node 110, thereby obviating the need for a handoff to wireless access node 120. In some examples, once wireless communication device 101 determines that device 101 is moving towards serving wireless access node 110, device 101 could initiate a handoff timer to inhibit a handoff to another wireless access node 120. For example, wireless communication device 101 could inhibit the handoff to the other wireless access node 120 for at least a duration of the handoff timer, or could inhibit a wireless communication transceiver of wireless communication device 101 from activating for at least the duration of the handoff timer. In some examples, wireless communication device 101 inhibits a handoff to another wireless access node 120 by recalculating whether the CINR and RSSI of the RF signal between device 101 and node 110 has fallen below a threshold prior to initiating the handoff.

On the other hand, if wireless communication device 101 is not moving towards wireless access node 110, wireless communication device 101 initiates the handoff to the other wireless access node 120 (206). For example, if wireless communication device 101 is moving away from wireless access node 110, it is possible that device 101 will soon enter the geographic area designated as sector 126 served by wireless access node 120, which would then necessitate a handoff to wireless access node 120.

In some examples, prior to initiating the handoff to the other wireless access node 120, wireless communication device 101 could determine a target RF signal quality of a target RF signal between wireless communication device 101 and the other wireless access node 120, and could optionally wait for at least a duration of a handoff timer prior to determining the target RF signal quality. Wireless communication device 101 could then calculate an RF signal ratio by dividing the RF signal quality of the RF signal between device 101 and wireless access node 110 by the target RF signal quality determined for wireless access node 120. Wireless communication device 101 may then compare the RF signal ratio to a threshold value, and initiate the handoff to the other wireless access node 120 if the RF signal ratio falls below the threshold value. In this manner, the handoff to the other wireless access node 120 is performed when it would result in an improvement in RF signal quality over what is provided by wireless access node 110.

Advantageously, by considering the location and velocity of wireless communication device 101 served by a wireless access node 110, an unnecessary handoff to another wireless access node 120 that would otherwise occur upon detection of reduced RF signal quality may be prevented. For example, the RF signal quality between wireless communication device 101 and wireless access node 110 may only be reduced temporarily, such as when the signal is obstructed by trees or other objects, in which case no handoff to another wireless access node 120 is required. By determining the location and direction of movement of wireless communication device 101 in such an event, an intelligent decision can be made as to whether a handoff to the other wireless access node 120 is really necessary. In this manner, wireless communication device 101 may preserve battery power by inhibiting a wireless communication transceiver of device 101 from powering up in order to communicate with the other wireless access node 120 incidental to initiation of the unnecessary handoff.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access nodes 110 and 120.

Wireless access nodes 110 and 120 each comprise RF communication circuitry and an antenna. The RF communication circuitry typically includes an amplifier, filter, RF modulator, and signal processing circuitry. Wireless access nodes 110 and 120 may also comprise a router, server, memory device, software, processing circuitry, cabling, power supply, network communication interface, structural support, or some other communication apparatus. Wireless access nodes 110 and 120 could each comprise a base station, Internet access node, telephony service node, wireless data access point, or some other wireless communication system—including combinations thereof. Some examples of wireless access nodes 110 and 120 include a base transceiver station (BTS), base station controller (BSC), radio base station (RBS), Node B, enhanced Node B (eNode B), and others. Wireless network protocols that may be utilized by wireless access nodes 110 and 120 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Sectors 112-119 and 122-129 each comprise geographic areas with approximate boundary lines as indicated by the dotted lines on FIG. 1, which are typically defined by the signal propagation characteristics and coverage capabilities of respective wireless access nodes 110 and 120. Wireless access node 110 serves sectors 112-119, and wireless access node 120 serves sectors 122-129. Each sector 112-119 and 122-129 represents a different coverage area of their respective wireless access nodes 110 and 120. For example, each sector 112-119 served by wireless access node 110 may be served by separate antennas of wireless access node 110, providing each sector 112-119 a separate direction of tracking and/or different range with respect to the other sectors. As shown in FIG. 1, sectors 112-115 served by wireless access node 110 are adjacent to node 110, while edge sectors 116-119 served by wireless access node 110 are located on the periphery or outer boundary of coverage provided by node 110. Likewise, sectors 122-125 served by wireless access node 120 are adjacent to node 120, while edge sectors 126-129 served by wireless access node 120 are located on the periphery or outer edge of coverage provided by node 120.

Communication network 130 comprises the core network of a wireless communication provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 102 uses the air or space as the transport medium. Wireless communication link 102 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 102 may comprise many different signals sharing the same link. For example, wireless communication link 102 could include multiple signals operating in a single propagation path comprising multiple communication sessions, frequencies, timeslots, transportation ports, logical transportation links, network sockets, IP sockets, packets, or communication directions—including combinations thereof.

Communication links 111 and 121 use metal, air, space, optical fiber such as glass or plastic, or some other material as the transport medium—including combinations thereof. Communication links 111 and 121 could use various communication protocols, such as TDM, IP, Ethernet, telephony, optical networking, hybrid fiber coax (HFC), communication signaling, wireless protocols, or some other communication format—including combinations thereof. Communication links 111 and 121 may be direct links or could include intermediate networks, systems, or devices.

Figure 3:
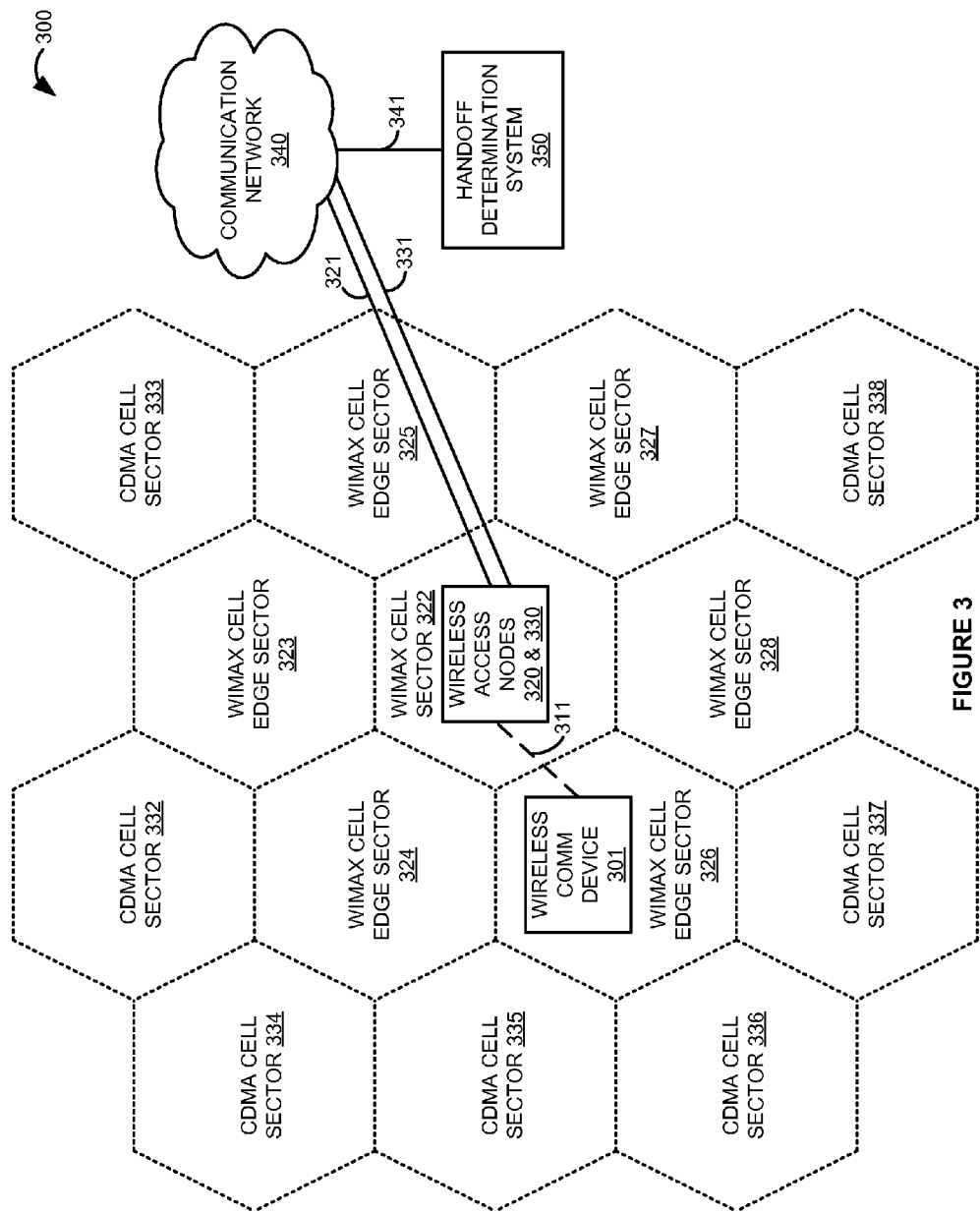
FIG. 3 is a block diagram that illustrates a communication system in an exemplary embodiment.

FIG. 3 is a block diagram that illustrates communication system 300. Communication system 300 includes wireless communication device 301, wireless access nodes 320 and 330, communication network 340, and handoff determination system 350. As shown in FIG. 3, wireless communication device 301 and wireless access node 330 are presently in communication over wireless communication link 311, but device 301 and wireless access node 320 could communicate over a similar wireless link (not shown) depending on the location of wireless communication device 301 and other factors. Wireless access node 320 and communication network 340 communicate over communication link 321, while wireless access node 330 and communication network 340 are in communication over communication link 331. Communication network 340 and handoff determination system 350 communicate over communication link 341.

In FIG. 3, wireless access nodes 320 and 330 are shown within the same block located at the center of WiMAX cell sector 322 because the wireless transceivers of nodes 320 and 330 are mounted to the same physical structure in this example. Wireless communication device 301 comprises a dual-mode wireless communication device in this example, capable of communicating with both third generation (3G) CDMA wireless access networks and fourth generation (4G) WiMAX wireless access networks. Wireless access node 320 provides 4G WiMAX cell sector coverage to WiMAX cell sectors 322-328, while wireless access node 330 provides 3G CDMA cell sector coverage to CDMA cell sectors 332-338. WiMAX cell edge sectors 323-328 served by wireless access node 320 are located on the periphery of coverage provided by node 320. Note that although CDMA cell sector coverage is only shown in FIG. 3 on the outlying CDMA cell sectors 332-338, wireless access node 330 would also typically provide CDMA coverage in the geographic areas covered by WiMAX cell sectors 322-328, but is not shown on FIG. 3 for clarity.

Figure 4:
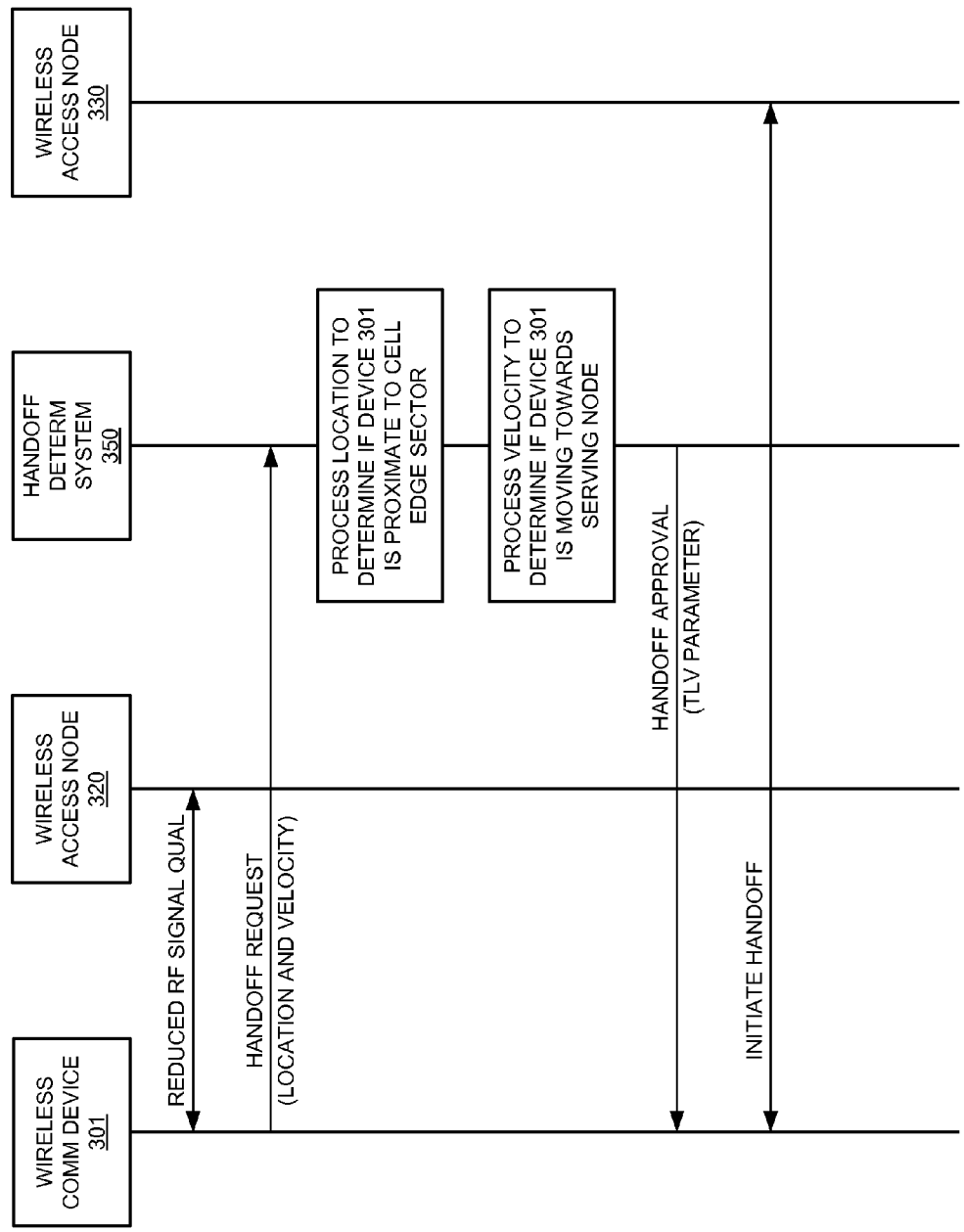
FIG. 4 is a sequence diagram that illustrates an operation of the communication system in an exemplary embodiment.

FIG. 4 is a sequence diagram that illustrates an operation of communication system 300 in an exemplary embodiment. As shown in FIG. 3, wireless communication device 301 is presently located in WiMAX cell edge sector 326 and in communication with wireless access node 320 utilizing a 4G WiMAX wireless protocol. Wireless communication device 301 typically receives frequent status metrics associated with transport levels of the RF signal between device 301 and wireless access node 320, such as a carrier to interference plus noise ratio (CINR) and a receive signal strength indicator (RSSI). The operation of FIG. 4 begins with wireless communication device 301 detecting a reduction in RF signal quality of the RF signal between device 301 and node 320 on wireless communication link 311 based on these status metrics.

Instead of powering up another radio antenna or initiating a handoff to another wireless access node 330 responsive to detecting the reduction in RF signal quality, wireless communication device 301 transfers a handoff request for delivery to handoff determination system 350. Wireless communication device 301 includes its present location and a velocity vector of device 301 in the handoff request transmitted to handoff determination system 350.

Handoff determination system 350 receives the handoff request from wireless communication device 301 and processes the location to determine if device 301 is proximate to a cell edge sector. In this case, wireless communication device 301 is located within WiMAX cell edge sector 326, so handoff determination system 350 determines that device 301 is proximate to a cell edge sector 326. Note that in some examples, determining if wireless communication device 301 is proximate to a cell edge sector could comprise determining that device 301 is located in a cell sector 322 that is adjacent to a cell edge sector 323-328. Handoff determination system 350 could be programmed with information regarding which cell sectors comprise edge sectors 323-328 of wireless access node 320, or could have access to retrieve a location-based handoff table comprising such information from communication network 340 or some other network element or database.

Responsive to determining that wireless communication device 301 is located within WiMAX cell edge sector 326, handoff determination system 350 processes the velocity vector to determine the velocity and direction that device 301 is moving. In particular, handoff determination system 350 processes the velocity vector to determine whether device 301 is moving towards the serving wireless access node 320. In this example, handoff determination system 350 determines that wireless communication device 301 is not moving towards the serving wireless access node 320, but is instead moving away from node 320 towards CDMA cell sector 335. Handoff determination system 350 could compare the location and velocity vector provided by wireless communication device 301 to threshold values to determine whether to approve a handoff for device 301. In some examples, even if handoff determination system 350 determines that device 301 is not located within a cell edge sector 323-328, such as when device 301 is located within WiMAX cell sector 322, handoff determination system may approve a handoff if the velocity and direction of device 301 indicates that device 301 is moving towards an edge sector 323-328.

Since wireless communication device 301 is moving towards CDMA cell sector 335, and not towards the wireless access node 320 presently serving device 301, the reduced RF signal quality detected by device 301 that prompted the handoff request is probably caused by the increasing distance between device 301 and node 320, and is not likely to improve given the velocity and direction that device 301 is traveling. In this case, handoff determination system 350 approves the handoff request, since a handoff to wireless access node 330 appears necessary to improve the RF signal quality for wireless communication device 301.

To inform device 301 of the approval for the handoff, handoff determination system 350 could direct wireless access node 320 to transmit a type length value (TLV) parameter in the payload of the base station identifier (BSID) or media access control (MAC) management message. The TLV parameter could be defined to simply provide an indication of approval to scan for a handoff, or could provide a BSID or sector identifier to indicate the wireless access node 330 and/or a specific sector 332-338 to which device 301 should initiate a handoff. In some examples, the TLV parameter could be added to MOB_NBR-ADV (mobile neighbor advertisement), MOB_SCN-REQ (mobile scanning interval allocation request), MOB_SCN-RSP (mobile scanning interval allocation response), and/or MOB_SCN-REP (mobile scanning result report) MAC management messages. In this case, handoff determination system 350 transmits the TLV parameter in a MAC management message indicating approval for wireless communication device 301 to initiate a handoff. Wireless communication device 301 thus receives the TLV parameter, and responsive to the approval from handoff determination system 350, initiates a handoff to wireless access node 330.

Figure 5:
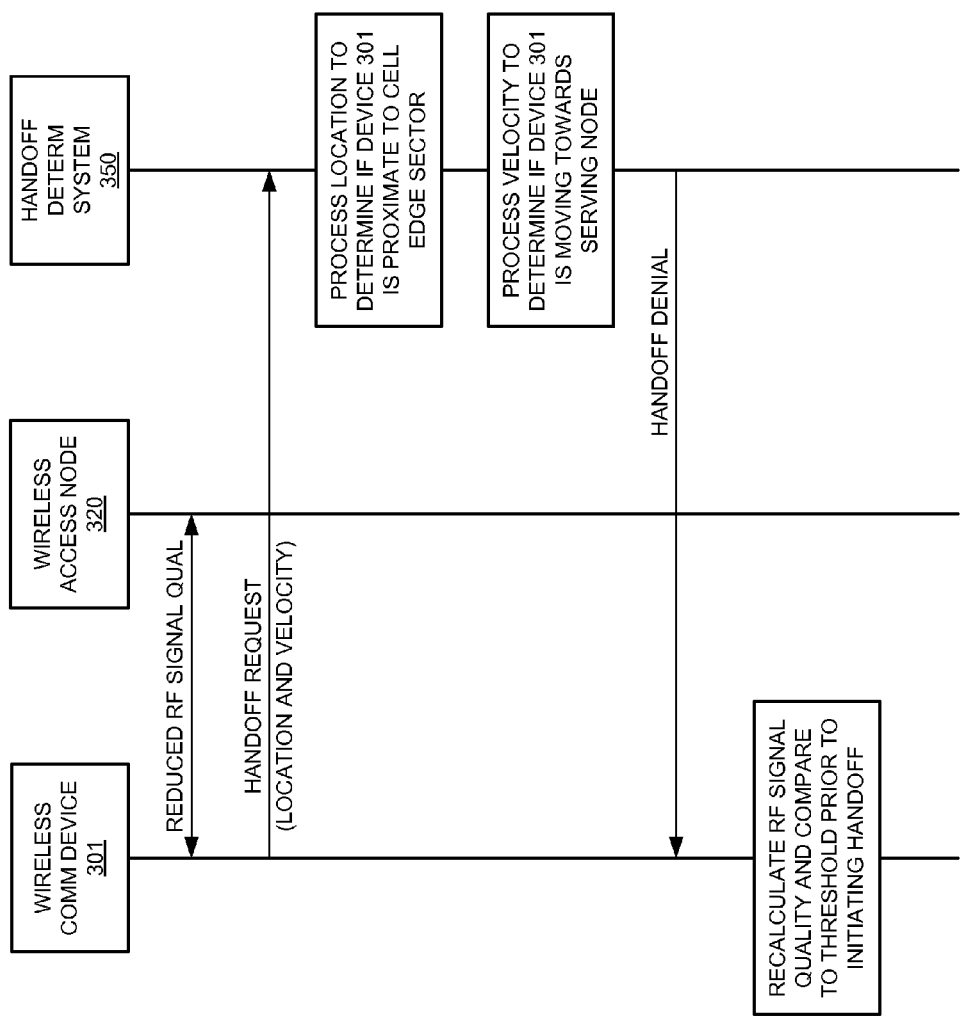
FIG. 5 is a sequence diagram that illustrates an operation of the communication system in an exemplary embodiment.

FIG. 5 is a sequence diagram that illustrates an operation of communication system 300 in an exemplary embodiment. As shown in FIG. 3, wireless communication device 301 is presently located in WiMAX cell edge sector 326 and in communication with wireless access node 320 utilizing a WiMAX wireless protocol. The operation of FIG. 5 begins with wireless communication device 301 observing a reduction in RF signal quality of the RF signal between device 301 and node 320 on wireless communication link 311 based on CINR and RSSI values detected by device 301.

Instead of powering up another radio antenna or initiating a handoff to another wireless access node 330 responsive to detecting the reduction in RF signal quality, wireless communication device 301 transfers a handoff request for delivery to handoff determination system 350. Wireless communication device 301 includes its present location and a velocity vector of device 301 in the handoff request transmitted to handoff determination system 350.

Handoff determination system 350 receives the handoff request from wireless communication device 301 and processes the location to determine if device 301 is proximate to a cell edge sector. In this case, wireless communication device 301 is located within WiMAX cell edge sector 326, so handoff determination system 350 determines that device 301 is proximate to a cell edge sector 326.

Responsive to determining that wireless communication device 301 is proximate to cell edge sector 326, handoff determination system 350 processes the velocity vector to determine whether device 301 is moving towards the serving wireless access node 320. In this example, handoff determination system 350 determines that wireless communication device 301 is actually moving towards the serving wireless access node 320.

Since wireless communication device 301 is moving towards the wireless access node 320 presently serving device 301, the reduced RF signal quality detected by device 301 that prompted the handoff request is likely caused by temporary interference, such as trees, buildings, or other obstructions located in the signal propagation path of wireless communication link 311. Since device 301 is traveling towards wireless access node 320, the RF signal quality observed by device 301 is likely to improve given the velocity and direction that device 301 is traveling. In this case, handoff determination system 350 denies the handoff request, because a handoff to another wireless access node 330 does not appear necessary to improve the RF signal quality for wireless communication device 301 since the signal quality should improve momentarily. Handoff determination system 350 could either actively provide a TLV parameter in a MAC management message for delivery to wireless communication device 301 to indicate denial of the handoff request, or could send no message and implicitly deny the handoff request if device 301 is configured to only initiate a handoff upon receipt of an approval message.

Upon determining that the handoff request was denied, wireless communication device 301 could recalculate the RF signal quality and compare the calculated value to a threshold prior to initiating a handoff. If the recalculated RF signal quality is below the threshold value, wireless communication device 301 could be configured to either initiate a handoff or transfer another handoff request to handoff determination system 350. In some examples, wireless communication device 301 could also be configured to wait for a duration of a handoff timer prior to initiating a handoff to another wireless access node 330. The duration of the handoff timer could be predetermined or pre-stored in wireless communication device 301, or could be provided by handoff determination system 350 in a TLV parameter inserted into a MAC management message.

In other examples, wireless communication device 301 could power up a second radio antenna to determine a target RF signal quality of a target RF signal between device 301 and another wireless access node 330, and could optionally wait for at least a duration of the handoff timer prior to determining the target RF signal quality. Wireless communication device 301 could then calculate an RF signal ratio by dividing the detected RF signal quality of the RF signal between device 301 and the serving wireless access node 320 by the target RF signal quality determined for wireless access node 330. Wireless communication device 301 could compare the RF signal ratio to a threshold value, and initiate the handoff to the target wireless access node 330 if the RF signal ratio falls below the threshold value. In this manner, the handoff to the other wireless access node 330 is performed when it would result in an improvement in RF signal quality over what is presently being provided by wireless access node 320.

Advantageously, by requesting approval for a handoff from handoff determination system 350 instead of scanning for another wireless access node 330 and/or immediately initiating a handoff, wireless communication device 301 preserves battery power in cases when handoff determination system 350 determines that a handoff is not necessary and denies the handoff request. In these instances, the RF signal quality reduction observed by device 301 typically improves, so no handoff was in fact necessary. By not powering up additional radio antennas or other wireless communication transceivers to scan for alternative wireless access nodes 330 to initiate a handoff, the battery life of wireless communication device 301 is extended, enhancing the experience of a user operating device 301.

Figure 6:
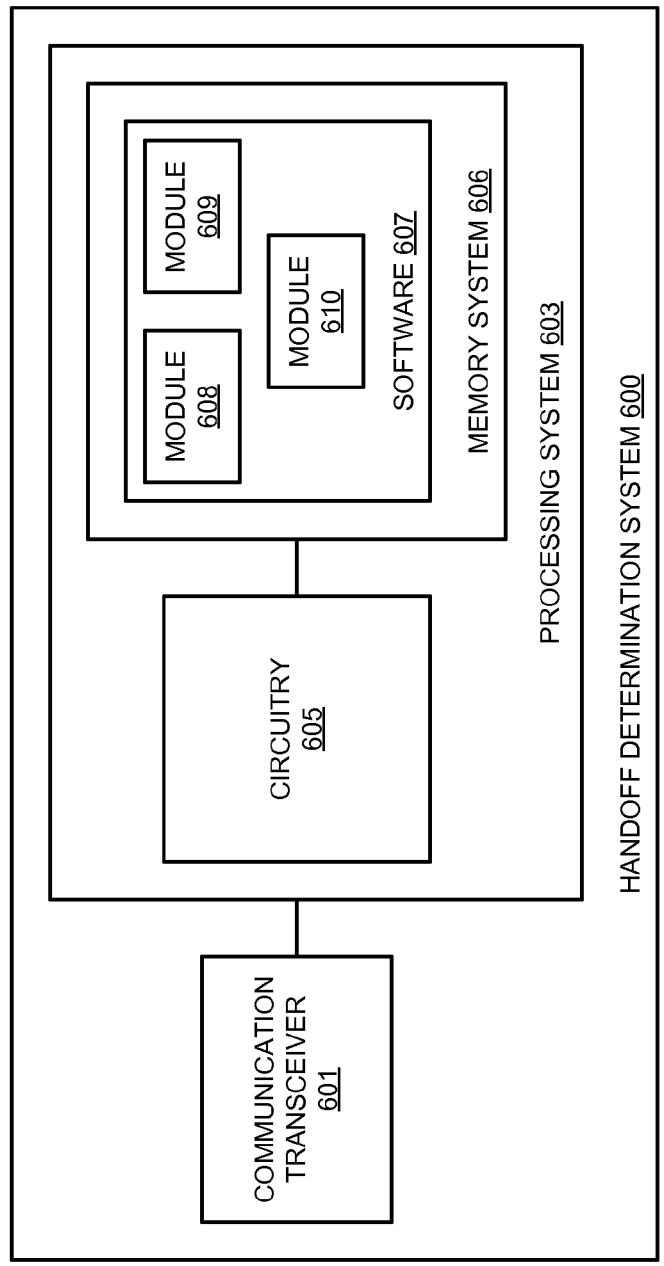
FIG. 6 is a block diagram that illustrates a handoff determination system.

FIG. 6 is a block diagram that illustrates handoff determination system 600. Handoff determination system 600 provides an example of handoff determination system 350, although system 350 may use alternative configurations. Handoff determination system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 could be configured to receive a handoff request transmitted from a wireless communication device. Communication transceiver 601 is further configured to transfer a denial message for delivery to the wireless communication device if the wireless communication device is moving towards a wireless access node, and transfer an approval message for delivery to the wireless communication device indicating approval for the wireless communication device to initiate a handoff to another wireless access node if the wireless communication device is not moving towards the wireless access node.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in some examples.

When executed by circuitry 605, operating software 607 directs processing system 603 to operate as described herein for handoff determination system 350. In particular, operating software 607 may direct processing system 603 to, in response to a handoff request received from a wireless communication device, process a location indicator to determine if the wireless communication device is proximate to an edge sector of a wireless access node. Operating software 607 may further direct processing system 603 to, if the wireless communication device is proximate to the edge sector, process a velocity indicator to determine if the wireless communication device is moving towards the wireless access node. Operating software 607 may further direct processing system 603 to, if the wireless communication device is moving towards the wireless access node, inhibit a handoff to another wireless access node by directing communication transceiver 601 to transfer a denial message for delivery to the wireless communication device. Operating software 607 may further direct processing system 603 to, if the wireless communication device is not moving towards the wireless access node, direct communication transceiver 601 to transfer an approval message for delivery to the wireless communication device indicating approval for the wireless communication device to initiate the handoff to the other wireless access node.

In this example, operating software 607 comprises an edge sector determination software module 608 that processes a location indicator to determine if a wireless communication device is proximate to an edge sector of a wireless access node. Additionally, operating software 607 comprises a velocity analysis software module 609 that processes a velocity indicator to determine if the wireless communication device is moving towards the wireless access node. Operating software 607 also comprises a request response software module 610 that inhibits a handoff to another wireless access node by transferring a denial message for delivery to the wireless communication device if the wireless communication device is moving towards the wireless access node, and transfers an approval message for delivery to the wireless communication device indicating approval for the wireless communication device to initiate the handoff to the other wireless access node if the wireless communication device is not moving towards the wireless access node.

Figure 7:
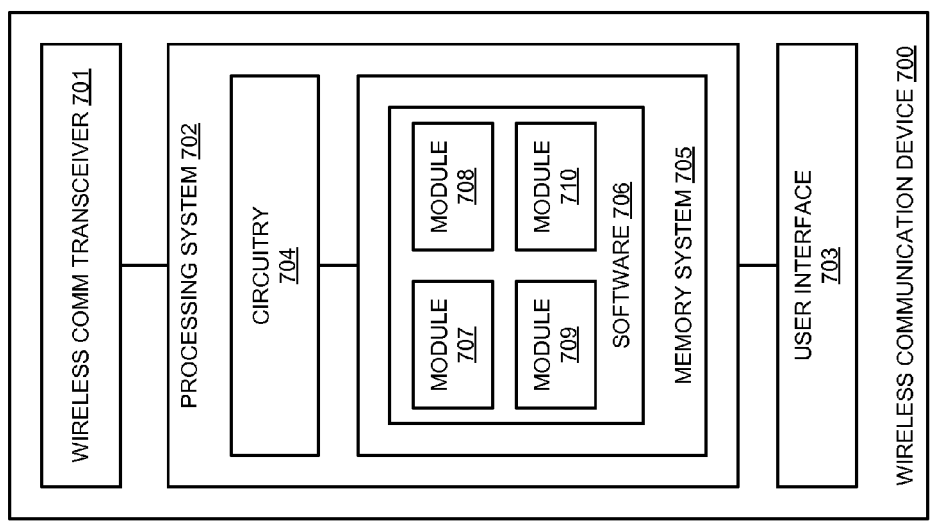
FIG. 7 is a block diagram that illustrates a wireless communication device.

FIG. 7 is a block diagram that illustrates wireless communication device 700. Wireless communication device 700 provides an example of wireless communication device 101, although device 101 could use alternative configurations. Wireless communication device 700 comprises wireless communication transceiver 701, processing system 702, and user interface 703. Processing system 702 is linked to wireless communication transceiver 701 and user interface 703. Processing system 702 includes processing circuitry 704 and memory system 705 that stores operating software 706. Operating software 706 comprises software modules 707-710. Wireless communication device 700 may include other well-known components such as a battery and enclosure that are not shown for clarity. Wireless communication device 700 may comprise a telephone, computer, e-book, mobile Internet appliance, media player, game console, wireless network interface card, or some other wireless communication apparatus—including combinations thereof.

Wireless communication transceiver 701 comprises RF communication circuitry and an antenna. The RF communication circuitry typically includes an amplifier, filter, RF modulator, and signal processing circuitry. Wireless communication transceiver 701 may also include a memory system, software, processing circuitry, or some other communication device. Wireless communication transceiver 701 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 701 is configured to monitor an RF signal between wireless communication device 700 and a wireless access node to detect a reduction in RF signal quality.

User interface 703 comprises components that interact with a user to receive user inputs and to present media and/or information. User interface 703 may include a speaker, microphone, buttons, lights, display screen, touch screen, touch pad, scroll wheel, communication port, or some other user input/output apparatus—including combinations thereof. User interface 703 may be omitted in some examples.

Processing circuitry 704 comprises microprocessor and other circuitry that retrieves and executes operating software 706 from memory system 705. Processing circuitry 704 may comprise a single device or could be distributed across multiple devices—including devices in different geographic areas. Processing circuitry 704 may be embedded in various types of equipment. Memory system 705 comprises a non-transitory computer readable storage medium, such as a disk drive, flash drive, data storage circuitry, or some other hardware memory apparatus. Memory system 705 may comprise a single device or could be distributed across multiple devices—including devices in different geographic areas. Memory system 705 may be embedded in various types of equipment. Processing circuitry 704 is typically mounted on a circuit board that may also hold memory system 705 and portions of communication transceiver 701 and user interface 703. Operating software 706 comprises computer programs, firmware, or some other form of machine-readable processing instructions. Operating software 706 may include an operating system, utilities, drivers, network interfaces, applications, or some other type of software. In this example, operating software 706 comprises software modules 707-710, although software 706 could have alternative configurations in some examples.

When executed by processing circuitry 704, operating software 706 directs processing system 702 to operate wireless communication device 700 as described herein for wireless communication device 101. In particular, operating software 706 directs processing system 702 to determine a location indicator and a velocity indicator of wireless communication device 700. Further, operating software 706 directs processing system 702 to direct wireless communication transceiver 701 to monitor an RF signal between wireless communication device 700 and a wireless access node to detect a reduction in RF signal quality. If the reduction in the RF signal quality is detected, operating software 706 directs processing system 702 to process the location indicator to determine if wireless communication device 700 is proximate to an edge sector of the wireless access node. If wireless communication device 700 is proximate to the edge sector, operating software 706 directs processing system 702 to process the velocity indicator to determine if wireless communication device 700 is moving towards the wireless access node. If wireless communication device 700 is moving towards the wireless access node, operating software 706 directs processing system 702 to inhibit a handoff to another wireless access node. If wireless communication device 700 is not moving towards the wireless access node, operating software 706 directs processing system 702 to initiate the handoff to the other wireless access node.

In this example, operating software 706 comprises a status monitoring software module 707 that determines a location indicator and a velocity indicator of wireless communication device 700, and monitors an RF signal between wireless communication device 700 and a wireless access node to detect a reduction in RF signal quality. Additionally, operating software 706 comprises an edge sector determination software module 708 that processes the location indicator to determine if wireless communication device 700 is proximate to an edge sector of the wireless access node if the reduction in the RF signal quality is detected. Operating software 706 also comprises a velocity analysis software module 709 that processes the velocity indicator to determine if wireless communication device 700 is moving towards the wireless access node if wireless communication device 700 is proximate to the edge sector. Further, operating software 706 comprises a handoff decision software module 710 that inhibits a handoff to another wireless access node if wireless communication device 700 is moving towards the wireless access node, and initiates the handoff to the other wireless access node if wireless communication device 700 is not moving towards the wireless access node.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
    determining a location indicator and a velocity indicator of the wireless communication device;
    monitoring a radio frequency (RF) signal between the wireless communication device and a wireless access node to detect a reduction in RF signal quality;
    if the reduction in the RF signal quality is detected, processing the location indicator to determine if the wireless communication device is proximate to an edge sector of the wireless access node;
    if the wireless communication device is proximate to the edge sector, processing the velocity indicator to determine if the wireless communication device is moving towards the wireless access node;
    if the wireless communication device is moving towards the wireless access node, inhibiting a handoff to another wireless access node; and
    if the wireless communication device is not moving towards the wireless access node, waiting for at least a duration of a handoff timer prior to determining a target RF signal quality of a target RF signal between the wireless communication device and the other wireless access node, calculating an RF signal ratio by dividing the RF signal quality of the RF signal between the wireless communication device and the wireless access node by the target RF signal quality, comparing the RF signal ratio to a threshold value, and if the RF signal ratio falls below the threshold value initiating the handoff to the other wireless access node.

2. The method of claim 1 wherein inhibiting the handoff to the other wireless access node comprises inhibiting the handoff to the other wireless access node for at least a duration of a handoff timer.

3. The method of claim 1 wherein inhibiting the handoff to the other wireless access node comprises inhibiting a wireless communication transceiver of the wireless communication device from activating for at least a duration of a handoff timer.

4. The method of claim 1 wherein the velocity indicator comprises a velocity vector indicating a direction of velocity of the wireless communication device.

5. A wireless communication device comprising:
   a processing system configured to determine a location indicator and a velocity indicator of the wireless communication device;
   a wireless communication transceiver configured to monitor a radio frequency (RF) signal between the wireless communication device and a wireless access node to detect a reduction in RF signal quality;
   if the reduction in the RF signal quality is detected, the processing system configured to process the location indicator to determine if the wireless communication device is proximate to an edge sector of the wireless access node;
   if the wireless communication device is proximate to the edge sector, the processing system configured to process the velocity indicator to determine if the wireless communication device is moving towards the wireless access node;
   if the wireless communication device is moving towards the wireless access node, the processing system configured to inhibit a handoff to another wireless access node; and
   if the wireless communication device is not moving towards the wireless access node, the processing system configured to wait for at least a duration of a handoff timer prior to determining a target RF signal quality of a target RF signal between the wireless communication device and the other wireless access node, calculate an RF signal ratio by dividing the RF signal quality of the RF signal between the wireless communication device and the wireless access node by the target RF signal quality, compare the RF signal ratio to a threshold value, and initiate the handoff to the other wireless access node if the RF signal ratio falls below the threshold value.

6. The wireless communication device of claim 5 wherein the processing system configured to inhibit the handoff to the other wireless access node comprises the processing system configured to inhibit the handoff to the other wireless access node for at least a duration of a handoff timer.

7. The wireless communication device of claim 5 wherein the processing system configured to inhibit the handoff to the other wireless access node comprises the processing system configured to inhibit a second wireless communication transceiver of the wireless communication device from activating for at least a duration of a handoff timer.

8. The wireless communication device of claim 5 wherein the velocity indicator comprises a velocity vector indicating a direction of velocity of the wireless communication device.

9. A method to determine handoffs for a wireless communication device, the method comprising:
   in the wireless communication device:
      determining a location indicator and a velocity indicator of the wireless communication device;
      monitoring a radio frequency (RF) signal between the wireless communication device and a wireless access node to detect a reduction in RF signal quality;
      if the reduction in the RF signal quality is detected, transferring a handoff request for delivery to a handoff determination system, wherein the handoff request includes the location indicator and the velocity indicator;
   in the handoff determination system:
      in response to the handoff request, processing the location indicator to determine if the wireless communication device is proximate to an edge sector of the wireless access node;
      if the wireless communication device is proximate to the edge sector, processing the velocity indicator to determine if the wireless communication device is moving towards the wireless access node;
      if the wireless communication device is moving towards the wireless access node, inhibiting a handoff to another wireless access node by transferring a denial message for delivery to the wireless communication device; and
      if the wireless communication device is not moving towards the wireless access node, waiting for at least a duration of a handoff timer prior to determining a target RF signal quality of a target RF signal between the wireless communication device and the other wireless access node, calculating an RF signal ratio by dividing the RF signal quality of the RF signal between the wireless communication device and the wireless access node by the target RF signal quality, comparing the RF signal ratio to a threshold value, and if the RF signal ratio falls below the threshold value transferring an approval message for delivery to the wireless communication device indicating approval for the wireless communication device to initiate the handoff to the other wireless access node.

10. The method of claim 9 further comprising the wireless communication device processing the denial message and inhibiting the handoff to the other wireless access node in response to the denial message.

11. The method of claim 9 further comprising the wireless communication device processing the approval message and initiating the handoff to the other wireless access node in response to the approval message.

* * * * *